United States Patent [19]

Lada

[11] Patent Number: 5,305,323
[45] Date of Patent: Apr. 19, 1994

[54] TECHNIQUE FOR DIGITALLY DETECTING BIT-ERROR DENSITIES THAT OCCUR IN A SERIAL BIT STREAM

[75] Inventor: Timothy P. Lada, Raleigh, N.C.

[73] Assignee: Siemens Stromberg-Carlson, Boca Raton, Fla.

[21] Appl. No.: 904,345

[22] Filed: Jun. 25, 1992

[51] Int. Cl.[5] .............................................. G06F 11/30
[52] U.S. Cl. ........................................ 371/5.1; 371/5.5
[58] Field of Search .................. 371/5.1, 5.5, 5.3, 5.4, 371/16.5, 29.1, 47.1

[56] References Cited

U.S. PATENT DOCUMENTS 5,138,616  8/1992  Wagner, Jr. et al. ................ 371/5.1
5,166,890  11/1992  Smischny ............................. 371/5.1

Primary Examiner—Vincent P. Canney
Attorney, Agent, or Firm—Joseph S. Codispoti

[57] ABSTRACT

Apparatus, and an accompanying method, for accurately detecting bit-error densities in a serial bit stream and particularly relatively low bit-error densities. Specifically, detected bit-errors are synchronized to a bit clock using a error retiming circuit (130). Subsequently, the bit-errors are counted using a first counter (165) during a pre-defined measurement interval, equivalent to a specified number of bit clock cycles. A second counter (205) establishes the measurement interval by counting the specified number of bit clock pulses. Whenever the first counter attains a count larger than a pre-defined count, during the measurement interval, an output (alarm) signal is generated to indicate that a pre-defined threshold error density has been exceeded. Both the first and second counters are then reset at the conclusion of the measurement interval, and so on for successive measurement intervals. To assure that the measured bit-error density declines to a sufficiently low value before the output signal terminates, the measurement interval is extended once the output signal occurs. Hence, output signal is produced when the pre-defined threshold is exceeded but is reset only when the actual measured bit-error density decreases, typically by an order of magnitude, below the threshold error density.

14 Claims, 1 Drawing Sheet

TECHNIQUE FOR DIGITALLY DETECTING BIT-ERROR DENSITIES THAT OCCUR IN A SERIAL BIT STREAM

BACKGROUND OF THE DISCLOSURE

1. Field of the Invention

The invention relates to a technique, specifically apparatus and an accompanying method, for detecting bit-error densities in a serial bit stream, and particularly to such a technique that accurately detects relatively low bit-error densities.

2. Description of the Prior Art

Currently, high speed bit-serial communication is experiencing increasing use across many application areas, not the least of which being telecommunications. Over the past two decades and particularly within the past few years, serial communication equipment has become commercially available that offers significantly increased transmission rates, e.g., in excess of $10^8$ bits/-second for high speed digital telecommunications equipment, and at substantially reduced error rates.

Consequently, through the proliferation of such high-speed bit-serial communication equipment, a need has existed in the art, though intensifying of late, to accurately measure bit-error rates (also synonymously referred to herein as "bit-error densities"). In that regard, an alarm condition is often generated whenever a measured bit-error rate has exceeded a desired threshold level. The alarm condition, frequently indicated by a pre-defined, e.g. "high", signal level on a specific control line (i.e., an "alarm signal"), activates ancillary equipment, such as for example diagnostic, test or alternate switching, routing or "back-up" transmission equipment, to provide appropriate corrective action to subsequently reduce the measured error rate to within a nominal range.

Conventional serial bit-error rate detection equipment has typically relied on a combination of analog and digital circuitry to provide an error rate measurement. In particular, this equipment incorporated a digital serial bit-error detector to: monitor a bit-serial transmission stream, determine whenever a bit serial error has occurred and provide a suitable indication, such as an output pulse, whenever a serial bit-error has been detected. The output pulse was then used to charge a capacitor. Clearly, as the number of pulses increased during a measurement interval, so did the charge on the capacitor and the voltage appearing thereacross. At the conclusion of a measurement interval, the capacitor was discharged in preparation for the next successive measurement interval. The voltage appearing across the capacitor, prior to its being discharged, was routed, in turn, to analog circuitry, such as suitable amplifiers and filter circuits, for suitable signal conditioning and scaling. A resulting scaled analog voltage was then applied to one input of a voltage comparator, with a pre-defined reference voltage, proportional to a desired bit-serial threshold error rate, being applied to another input thereof. The output signal produced by the comparator, once applied through a suitable driver and ancillary circuitry, was then used, in turn, to form the alarm signal.

Typically, the error rate is measured by the number of errors, x, which occur during an interval of $10^y$ data bits, with the value "x" being known as a mantissa and the value "y" being known as an exponent. Hence, the capacitor incrementally charged, with each detected bit-error, during a period of $10^y$ bits before being discharged. Whenever the scaled capacitor voltage, which is proportional to x error bits, exceeds the reference voltage, the alarm signal occurs as a result.

While such conventional serial bit-error rate detection equipment generally provided adequate performance at relatively high bit-error rates, this equipment suffered a number of drawbacks which significantly limited its ability to accurately function at relatively low bit-error rates. Specifically, by relying on analog components and analog voltage levels, the performance of the analog circuitry was susceptible to noise and also exhibited undue variations which adversely affected its performance. These variations resulted from offsets, temperature changes and drift, as well as from differences, associated with production tolerances, in the operational characteristics of the components, such as in resistors and capacitors, and from perturbations in supply voltage levels and analog pulse amplitudes. Unfortunately, these variations adversely affected the accuracy of the analog circuitry and hence of the resulting bit-error rate measurement. The resulting inaccuracies where particularly objectionable when low bit-error rates, such as for example 10 or less errors in $10^6$ bits, were being detected inasmuch as, at these rates and at the conclusion of a measurement interval, the capacitor charged to a very low voltage level, often comparable to voltage levels associated with offset, drift and/or most other adverse performance effects typically associated with analog circuitry. Hence, in an attempt to compensate (at least temporarily) for most, if not all, of these effects, potentiometers and/or other trimming devices were incorporated into the analog circuitry and then suitably adjusted during production test. This, in turn, increased the labor content and hence the cost of the detection equipment. This also increased the physical size of the circuitry and hence frustrated its integration. Furthermore, in those instances where high accuracy was required, the analog circuitry needed to be implemented with precision components. Inasmuch as these components were generally quite expensive, their use further inflated the cost of the circuitry and the resulting bit-error rate detection equipment.

Thus, a need currently exists in the art for a technique, specifically apparatus and an accompanying method, for accurately detecting bit-error rates in a serial bit stream and particularly relatively low bit-error rates. Advantageously, this technique should be substantially immune to adverse performance effects typically associated with analog circuitry, such as illustratively noise, offsets, drift, component voltage(s) tolerances and/or variations in the amplitude of the supply voltage or pulse levels. Furthermore, this apparatus should be relatively inexpensive to implement and quite easy to integrate.

SUMMARY OF THE INVENTION

Accordingly, an object of the present invention is to provide a technique that can accurately detect bit-error rates that occur in an incoming serial bit stream and particularly relatively low bit-error rates.

A specific object is to provide such a technique that is substantially immune to most, if not all, of the adverse performance effects, such as illustratively noise, offset and drift, that are commonly associated with analog circuitry, such as that used in conventional bit-error rate detectors.

Another specific object is to provide such a technique that utilizes apparatus which is relatively inexpensive to implement and quite easy to integrate.

These and other objects are advantageously achieved through my inventive digital bit-error rate detector. Specifically, in accordance with my inventive teachings, detected bit-errors are synchronized to a bit clock and then counted by a first counter during a measurement interval. The measurement interval is equivalent to a specified number of bit clock cycles. A second counter establishes the measurement interval by counting the specified number of bit clock pulses. Whenever the first counter attains a count larger than a preset count, during the measurement interval, an output (alarm) signal is generated to indicate that a preset (threshold) bit-error rate has been exceeded. Both the first and second counters are then reset at the conclusion of the measurement interval, and so on for successive measurement intervals.

A feature of my invention is to extend the measurement interval during which the first counter counts errors after an alarm signal is generated. Consequently, the alarm signal is not reset until the count of the first counter no longer attains a count larger than the preset count during the extended measurement interval. This feature effectively creates hysteresis wherein the output signal is produced when a first error rate is exceeded and the output signal is reset when a second error rate, lower than the first, is not exceeded, thereby assuring that the actual bit-error rate of the serial bit stream returns to a sufficiently low level before an alarm condition is terminated.

By advantageously eliminating the need for any analog circuitry, my inventive bit-error rate detector does not exhibit any of the inaccuracies typically associated with conventional analog bit-error rate detectors.

BRIEF DESCRIPTION OF THE DRAWING

The teachings of the present invention can be readily understood by considering the following detailed description in conjunction with the accompanying drawing, in which.

DETAILED DESCRIPTION

Figure 1:
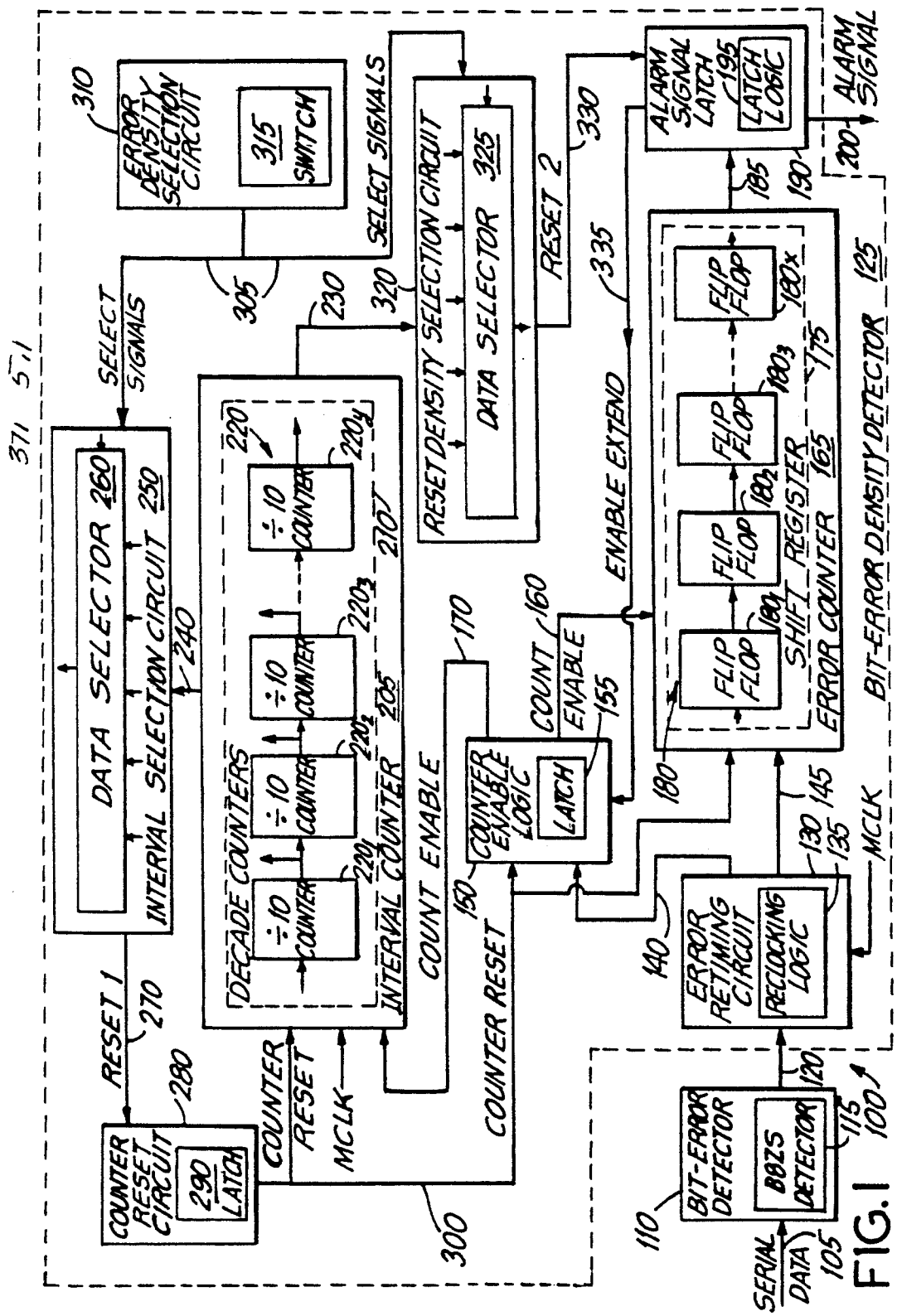
FIG. 1 depicts a block diagram of a preferred embodiment of my inventive apparatus for digitally detecting bit-error densities in a serial bit stream.

FIG. 1 depicts a block diagram of my inventive apparatus 100 for digitally detecting bit-error densities (also synonymously referred to herein as "bit-error rates"). Apparatus 100 comprises digital bit-error detector 110 connected, via lead 120, to bit-error density detector 125. In general, a bit stream to be measured is serially applied to an input of bit-error detector 110 with the resulting, detected bit-errors, represented by pulses or other output signals, being supplied to bit-error density detector 125. Bit-errors are counted during a specified interval of time, measured in data bits. Thus, a bit-error density of x bit-errors out of $10^y$ contiguous bits (where "x" and "y" are both pre-defined integers) is directly determined by detector 125. If the measured bit-error density exceeds a preset density, detector 125 produces an alarm signal.

Generally speaking, detector 125 contains, inter alia, error counter 165, interval counter 205, interval selection circuit 250 and alarm circuit 190. Through error counter 165, detector 125 directly counts the number of bit-errors, determined by error detector 110, that occur during a specified measurement (timing) interval. This interval is established by interval counter 205 operating in conjunction with interval selection circuit 250. Upon the occurrence of the first detected error in such an interval, interval counter 205 counts a number of clock pulses up to a preset count established by circuit 250. The clock pulses are synchronized with the bit rate of the serial bit stream such that a count of the number of clock pulses during the interval, e.g., $10^y$ is equivalent to the number of bits in the bit stream that occur during the interval. If the number of bit-errors counted by the error counter attains a specified count during the interval, i.e., greater than x errors, an alarm signal is generated by alarm circuit 190. However, if the error counter does not attain this count during the interval, both counters 165 and 205 are reset at the end of the interval and await a subsequent occurrence of the next bit-error at which time counters 165 and 205 are re-started to commence the next measurement interval, and so on.

More specifically, bit-error detector 110 detects bit-errors in a serial bit stream applied via signal path 105 and produces an error pulse, along signal path 120, for each bit-error detected. The bit-error detector is conventional and matched to the particular type of serial data stream being monitored. For example, if the data (bit) stream is B8ZS-type, then the bit-error detector must be a B8ZS-type detector. Illustratively, bit-error detector 110 is depicted as B8ZS detector 115. Since bit-error detectors are well-known in the art, detector 110 will not be described in any further detail herein.

Furthermore, in addition to the components previously discussed, bit-error density detector 125 also contains error retiming circuit 135, counter enable logic 150, counter reset circuit 280, error density selection circuit 310 and reset density selection circuit 320.

Within detector 125, each detected bit-error, typically represented by an error pulse, is transferred, along signal path 120, to error retiming circuit 130. The error retiming circuit retimes each error pulse using reclocking logic 135 to synchronize the error pulse with a master clock signal (MCLK). The master clock signal runs at the same rate as the data rate of the serial bit stream and is synchronous therewith, i.e., it is a bit clock. For example, if the data rate is 1 million bits per second, then the MCLK signal runs at 1 MHz.

Each resulting retimed error pulse is transferred, along signal path 140, to counter enable logic 150 and, along signal path 145, to error counter 165. In general, the counter enable logic comprises latch 155 that latches upon the occurrence of a retimed error pulse. The counter enable logic produces two latched signals shown as COUNT ENABLE signals. The COUNT ENABLE signals, transferred along signal paths 170 and 160, respectively, enable both interval counter 205 and error counter 165 to begin counting.

Error counter 165 counts the number of retimed error pulses which occur on signal path 145. The resulting count represents the mantissa (x) in an error density (i.e., x errors in $10^y$ bits). When counter 165 attains a specific pre-defined count determined by the structure of the internal circuitry of the counter, this counter produces a signal, on signal path 185, indicating that the predetermined count has been attained. Typically to simplify the implementation, error counter 165 comprises shift register 175 having x flip-flop stages 180, specifically shown as containing individual flip-flops $180_1, 180_2, 180_3, \ldots, 180_x$, where x is equivalent to the predetermined threshold error count. Thus, when x error pulses have occurred, all the shift register stages 180 will fill with error pulses. Upon occurrence of another error pulse (i.e., the (x+1)th), the contents of the last shift register stage will be shifted onto signal path 185 to indicate that the threshold error density has been exceeded.

Alternatively, for added flexibility in accommodating variable threshold error counts, the shift register can be replaced with a binary counter of appropriate length, a comparator and a latch loadable through an external data source. A desired value of x+1 would be loaded into the latch, such as through an external microprocessor or other data source, during circuit initialization. The parallel outputs of the latch would be applied as one parallel input to the comparator, while the parallel outputs of the binary counter would be routed to another such parallel input. The output of the comparator would be routed onto signal path 185.

While error counter 165 counts the error pulses, interval counter 205 simultaneously counts clock pulses at the rate of the master clock, i.e., at the MCLK rate. In operation, interval counter 205 counts for a fixed period, i.e., a fixed number of clock cycles of MCLK, established by interval selection circuit 240. Typically, counter 205 comprises decade counter 210 which illustratively contains divide-by-ten counters 220, specifically individual decade counters $220_1$, $220_2$, $220_3$, ..., $220_y$ connected in series. Thus, illustratively, y such counters count $10^y$ clock cycles before rolling over. To establish the length of each measurement, i.e., timing, interval, interval selection circuit 240 comprises data selector 260 having a plurality of input ports, each input port being attached to an output of each different counter within counters 220. The electrical connection between the data selector and all the decade counters is collectively indicated by signal path 240. Error density selection circuit 310, typically formed of DIP (dual in-line package) switch 315 and associated pull-up resistors (not shown), generates appropriate signals, along signal path 305, to identify the output of a particular decade counter within counters 220 which will be routed through selector 260 to signal path 270. The selected input signal on path 240, when applied through selector 260 to path 270, becomes a reset signal (RESET1) that demarcates the end of each measurement interval. The RESET1 signal is used by counter reset circuit 280 to generate, a COUNTER RESET signal. Typically, circuit 280 comprises latch 290. The COUNTER RESET signal is applied along signal path 300 to reset interval counter 205, error counter 165, and counter enable logic 150. Specifically, counters 205 and 165 are reset to a zero count and logic 150 is reset such that the COUNT ENABLE signals are disabled.

The effect of the circuitry thus far discussed is that error counter 165 counts retimed error pulses during an interval maintained by interval counter 205 operating in combination with interval selection circuit 250 and counter reset circuit 280. When counter 205 reaches a count that causes the RESET1 signal to be generated by interval selection circuit 250, error counter 165 and interval counter 205 are reset. Subsequently, counter enable logic 150 awaits the next successively occurring bit-error pulse on path 120 to once again enable counters 165 and 205 to begin counting errors during the next successive measurement interval.

If error counter 165 attains the pre-defined count (i.e., x+1), a signal indicating that this count has been reached during the measurement interval is transferred, along signal path 185, to alarm signal latch 190. The signal on path 185 triggers alarm signal latch 190 to produce an alarm signal (ALARM), typically a "high" logic level on output lead 200, indicating that the predefined error density threshold, i.e., x errors in $10^y$ bits, has been exceeded. Typically, alarm signal latch 190 comprises resetable latch logic 195 which latches the trigger signal on path 185 and is reset by a specific reset signal (RESET2—which will be discussed in detail below) appearing on signal path 330.

Following the production of the ALARM signal, error density detector 125 continues operation as before, i.e., counting retimed error pulses during a specified measurement interval. However, to reset latch 190 and cancel the ALARM signal, the detected error density must fall below a specified density established by reset density selection circuit 320, i.e., a reset threshold density. Typically, the error density necessary for resetting the alarm signal latch is lower than the error density necessary to initially produce the ALARM signal. To establish the reset threshold density, the measurement interval during which error counter 165 may attain the pre-defined count is extended, i.e., interval counter 205 is enabled for a longer duration. Thus, hysteresis is established, i.e., the alarm signal is produced for one error density and reset for a different and numerically lower error density. For example, if the error density which triggered the alarm signal were, illustratively, 8 retimed error pulses in every $10^6$ MCLK cycles, the error density to reset the alarm signal is, illustratively, 8 retimed error pulses in every $10^7$ MCLK cycles. Thus, the alarm signal is produced until the contents of decade counter 205 reach $10^7$ without error counter 165 attaining a count of 8. This hysteretic operation assures that the actual bit-error density of the serial bit stream will sufficiently decline, i.e., here illustratively by an order of magnitude, before an alarm condition terminates. Of course, those skilled in the art will readily appreciate that the error densities used to produce and reset the alarm signal can be varied to any desired density desired by appropriately varying the size of counter 205 and/or the connection of selectors 250 and 325 thereto.

To facilitate a selectable reset threshold density, reset density selection circuit 320 typically comprises data selector 325 having a plurality of input ports connected, via collective signal path 230, to the output of each decade counter within interval counter 205. Each such output is connected to a different input to this selector. Error density selection circuit 310 generates, via DIP switch 315, appropriate selection signals, along signal path 305, for selecting the input port of the data selector, and hence the output of a particular counting stage in interval counter 205, to connect to signal path 330. The selected input signal on signal path 230, when routed, through selector 325, to signal path 330 becomes a reset signal (RESET2). Upon the occurrence of the RESET2 signal, alarm signal latch 190 is reset and counter enable logic 150 is permitted to enable the counters to once again count for a duration equivalent to the measurement interval upon the occurrence of the next successive error pulse.

By now, those skilled in the art will clearly realize that although my preferred embodiment has been described through a dedicated hardware implementation, my invention could very easily be implemented through software. In that regard, a suitably programmed processor, such as a sufficiently high speed microprocessor (with appropriate peripheral circuitry), could be connected, in lieu of detector 100, to: receive the detected bit errors from a bit error detector, suitably accumulate these errors during a resetable measurement interval, and generate an alarm signal in the event an accumulated count exceeded a desired threshold value. The microprocessor would be programmed in a manner readily apparent to those skilled in the art to provide the functions associated with detector 100. Furthermore, based upon desired performance considerations, such as clock speed, and other design tradeoffs, various parts of my invention, such as the interval counter and steering logic, could be implemented through dedicated high speed circuitry while the remainder of my invention could be implemented through software.

Although I have shown and described, in detail, a single embodiment of my invention, those skilled in the art can readily devise many other varied embodiments that still incorporate my inventive teachings.

I claim:

1. Apparatus (125) for detecting a bit-error density in a serial bit stream and for producing an output signal when the bit-error density exceeds a pre-defined value, said apparatus comprising:

retiming means (130), operating in response to a bit clock signal and detected bit-errors, for synchronizing each detected bit-error to the bit clock and producing an error pulse;

first counting means (165), connected to said retiming means, for counting each error pulse occurring during a first interval;

second counting means (205) for counting a number of bit clock cycles and for establishing said first interval equivalent to said number of bit clock cycles;

means (190), connected to said first counting means, for producing an output signal whenever said first counting means attains a specified bit error count during said first interval; and resetting means (250, 280), connected to said first and second counting means, for resetting said first and second counting means at an end of said first interval.

2. The apparatus of claim 1 further comprising:

second interval establishing means (320) for establishing a second interval differing in duration from said first interval; and output signal resetting means (195) for resetting said output signal producing means whenever said first counting means does not attain said specified bit error count during said second interval.

3. The apparatus of claim 2 wherein said second interval is longer than said first interval.

4. The apparatus of claim 1 wherein said second counting means comprises a plurality of divide by ten counters (220) connected in a series.

5. The apparatus of claim 1 wherein said first counting means comprises a shift register (165) having a plurality of stages (180), whereby said plurality of stages establishes said specified bit error count.

6. The apparatus of claim 1 wherein said first counting means determines a mantissa of a bit-error density and said second counting means determines an exponent of said bit-error density.

7. The apparatus of claim 2 further comprising means (250) for selecting a duration for said second interval and means (320) for selecting said first interval.

8. The apparatus of claim 7 wherein each of said selecting means further comprise data selectors (325, 260).

9. The apparatus of claim 1 further including bit-error detection means (110), responsive to said serial bit stream and connected to said retiming means, for detecting bit-errors in the serial bit stream.

10. A method for detecting a bit-error density in a serial bit stream and for producing an output signal when the bit-error density exceeds a pre-defined value, said method comprising the steps of:

synchronizing each detected bit-error with a bit clock;

converting each detected bit-error into an error pulse;

counting said error pulses occurring during a first interval using a first counter;

counting bit clock cycles using a second counter;

establishing said first interval equivalent to a specified number of bit clock cycles counted by said second counter;

producing an output signal whenever said first counter attains a specified bit error count during said first interval; and resetting said first and second counters at an end of said first interval.

11. The method of claim 10 further comprising the steps of:

establishing a second interval different from said first interval; and resetting said output signal whenever said first counter does not attain said specified bit error count during said second interval.

12. The method of claim 11 wherein said second interval is longer than said first interval.

13. The method of claim 11 further comprising the step of selecting a duration for said second interval and said first interval.

14. The method of claim 10 further comprising the step of detecting bit-errors in said serial bit stream.

* * * * *